United States Patent
Xu et al.

(10) Patent No.: US 11,695,170 B2
(45) Date of Patent: Jul. 4, 2023

(54) BATTERY-LEVEL NI—CO—MN MIXED SOLUTION AND PREPARATION METHOD FOR BATTERY-LEVEL MN SOLUTION

(71) Applicants: JINGMEN GEM CO., LTD, Hubei (CN); GEM CO., LTD, Guangdong (CN)

(72) Inventors: Kaihua Xu, Guangdong (CN); Zhenkang Jiang, Guangdong (CN); Qinxiang Li, Hubei (CN); Kun Zhang, Hubei (CN); Wenjie Wang, Hubei (CN); Jun Wang, Hubei (CN); Shihong Wen, Hubei (CN)

(73) Assignees: JINGMEN GEM CO., LTD, Hubei (CN); GEM CO., LTD, Guangdong (CN)

( * ) Notice: Subject to any disclaimer, the term of this patent is extended or adjusted under 35 U.S.C. 154(b) by 0 days.

(21) Appl. No.: 17/789,970

(22) PCT Filed: Dec. 31, 2019

(86) PCT No.: PCT/CN2019/130632
§ 371 (c)(1),
(2) Date: Jun. 29, 2022

(87) PCT Pub. No.: WO2021/134515
PCT Pub. Date: Jul. 8, 2021

(65) Prior Publication Data
US 2022/0384868 A1    Dec. 1, 2022

(30) Foreign Application Priority Data
Dec. 30, 2019  (CN) .......................... 201911389887.7

(51) Int. Cl.
*C01D 15/04*    (2006.01)
*C01F 5/28*    (2006.01)
(Continued)

(52) U.S. Cl.
CPC ............ *H01M 10/54* (2013.01); *C01D 15/04* (2013.01); *C01F 5/28* (2013.01); *C01F 11/22* (2013.01);
(Continued)

(58) Field of Classification Search
CPC .......... H01M 10/54; C01D 15/04; C01F 5/28; C01F 11/22; C01G 45/003; C01G 51/003; C01G 53/003; C22B 23/0453; C22B 47/10
(Continued)

(56) References Cited

FOREIGN PATENT DOCUMENTS

| CN | 104617349 A | 5/2015 |
|---|---|---|
| CN | 105206889 A * | 12/2015 |

(Continued)

OTHER PUBLICATIONS

International Search Report and Written Opinion for PCT/CN2019/130632 dated Aug. 28, 2020.
(Continued)

*Primary Examiner* — Melissa S Swain
(74) *Attorney, Agent, or Firm* — Barnes & Thornburg LLP

(57) ABSTRACT

Provided are a battery-level Ni—Co—Mn mixed solution and a preparation method for a battery-level Mn solution, the steps thereof comprising: acid dissolution (S1), alkalization to remove impurities (S2), synchronous precipitation of calcium, magnesium, and lithium (S3), deep ageing to remove impurities (S4), synergistic extraction (S5), and refining extraction (S6). The steps of deep ageing to remove impurities (S4) and synergistic extraction (S5) comprise: performing deep ageing on a filtrate obtained from the step of synchronous precipitation of calcium, magnesium, and lithium (S3), and after performing filtration to remove impurities, obtaining an aged filtrate; using P204 to extract
(Continued)

the aged filtrate and obtain a loaded organic phase, and subjecting the loaded organic phase to staged back-extraction to obtain the battery-level Ni—Co—Mn mixed solution and a Mn-containing solution. By means of the cooperation between the multiple process steps of synchronous precipitation of calcium, magnesium, and lithium (S3), deep ageing to remove impurities (S4), and synergistic extraction (S5), the impurity content of the obtained battery-level Ni—Co—Mn mixed solution is significantly lowered, and the battery-level Ni—Co—Mn mixed solution can be directly used to prepare a lithium battery ternary precursor material. At the same time, the battery-level Mn solution can also be obtained, which is favorable for large-scale applications of the process and increasing economic benefits.

6 Claims, 1 Drawing Sheet

(51) Int. Cl.

| | | |
|---|---|---|
| *H01M 10/54* | (2006.01) | |
| *C01F 11/22* | (2006.01) | |
| *C01G 45/00* | (2006.01) | |
| *C01G 51/00* | (2006.01) | |
| *C01G 53/00* | (2006.01) | |
| *C22B 3/00* | (2006.01) | |
| *C22B 47/00* | (2006.01) | |

(52) U.S. Cl.
CPC ......... *C01G 45/003* (2013.01); *C01G 51/003* (2013.01); *C01G 53/003* (2013.01); *C22B 23/0453* (2013.01); *C22B 47/00* (2013.01)

(58) Field of Classification Search
USPC .......................................................... 423/51
See application file for complete search history.

(56) References Cited

FOREIGN PATENT DOCUMENTS

| | | | | |
|---|---|---|---|---|
| CN | 105206889 A | | 12/2015 | |
| CN | 105206889 A | | 12/2015 | |
| CN | 106319228 A | | 1/2017 | |
| CN | 106505225 A | * | 3/2017 | |
| CN | 106505272 A | | 3/2017 | |
| CN | 106904667 A | | 6/2017 | |
| CN | 108517403 A | | 9/2018 | |
| CN | 109449523 A | * | 3/2019 | ........... C22B 23/043 |
| CN | 109449523 A | | 3/2019 | |
| CN | 109735709 A | | 5/2019 | |
| CN | 110512080 A | | 11/2019 | |
| KR | 101823952 B1 | | 1/2018 | |

OTHER PUBLICATIONS

First Search Report for CN 201911389887.7.
First Office Action for CN 201911389887.7 and the English Translation.
Notification of Grant issued in China dated Apr. 26, 2021.
Korean Office Action with English Translation issued for Application No. 10-2022-7026488, dated Nov. 29, 2022.

* cited by examiner

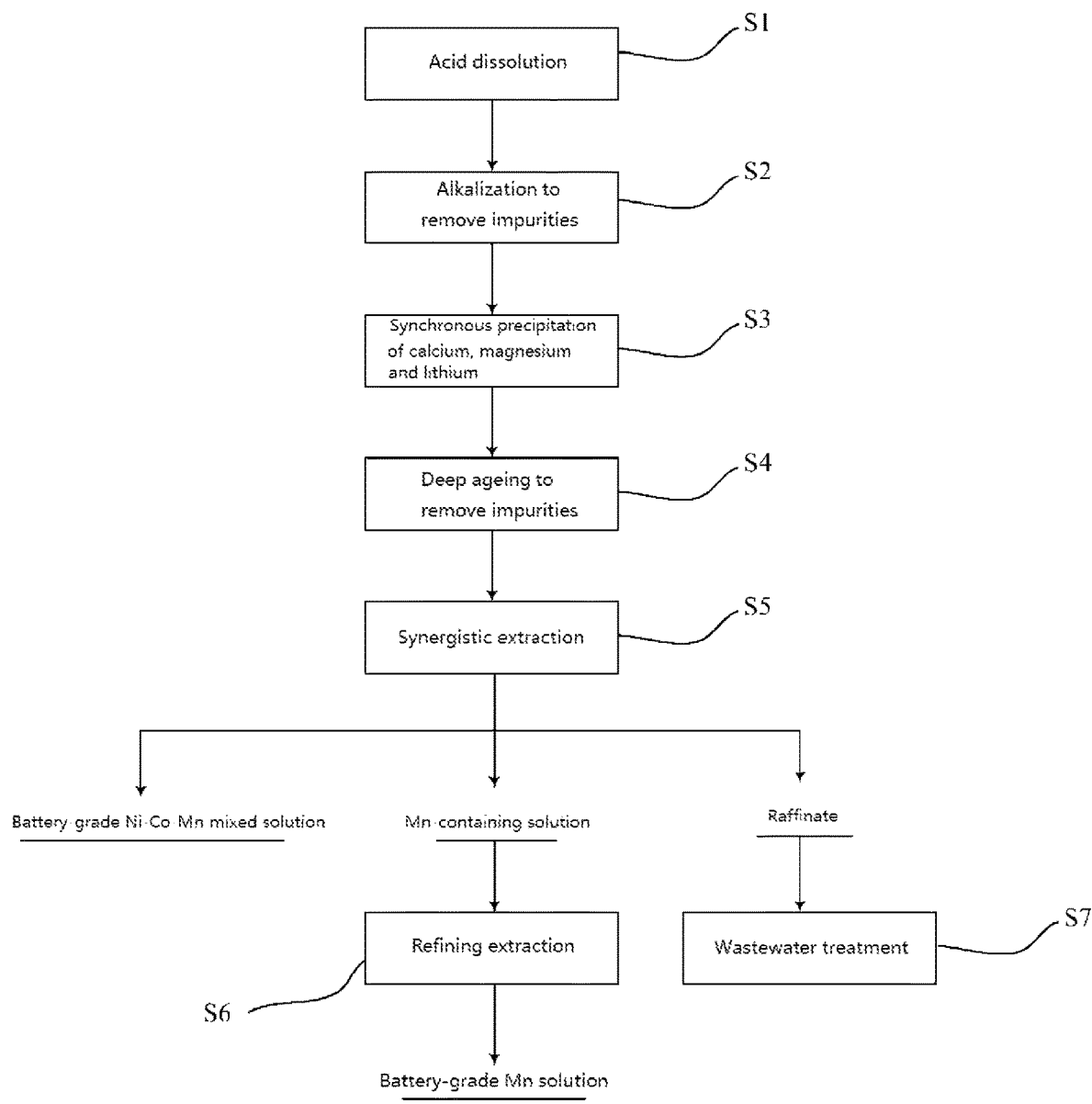

BATTERY-LEVEL NI—CO—MN MIXED SOLUTION AND PREPARATION METHOD FOR BATTERY-LEVEL MN SOLUTION

CROSS REFERENCE TO RELATED APPLICATIONS

This application is a U.S. national stage application under 35 U.S.C. § 371(b) of International Application No. PCT/CN2019/130632, filed Dec. 31, 2019, which claims priority to the China Patent Application No. 201911389887.7 filed on Dec. 30, 2019, the disclosures of both of which are hereby expressly incorporated by reference in their entirety.

TECHNICAL FIELD

The present application relates to the field of lithium-ion batteries, and especially to a method of preparing a battery-grade Ni—Co—Mn mixed solution and a battery-grade Mn solution.

BACKGROUND

The automotive power lithium-ion battery market has boomed in China, and the market for application has increasingly strict performance requirements for lithium-ion batteries. Currently, the most widely used power lithium-ion battery system is mainly the lithium iron phosphate system and the ternary system at home and abroad, such as the battery system composed of three metal elements of nickel-manganese-cobalt or nickel-cobalt-aluminum, and the high-performance automotive lithium-ion batteries have high manufacturing cost; due to the increasing growth in lithium battery use of new energy vehicles, a large number of waste batteries will be generated, and therefore, it has become an urgent problem to be solved today about how to effectively recycle waste lithium-ion batteries.

Currently, the recycle of waste lithium-ion batteries mainly adopts wet processing. For example, for ternary material batteries, the wet processing mainly adopts a process flow of reductive acid leaching-purification for impurity removal-extraction for separation, and for the aspect of purification for impurity step, the key point of this process is how to fully remove impurities contained in the leaching solution, such as calcium, magnesium, iron and aluminum, so as to obtain a Ni—Co—Mn recovery solution with better quality. In the prior art, multiple extractions are used to obtain a battery-grade nickel sulfate solution, manganese sulfate solution and cobalt sulfate solution, separately, and besides, after extracting the battery-grade nickel sulfate solution, manganese sulfate solution and cobalt sulfate solution separately, these solutions needs to be mixed again according to proportions to prepare a precursor for ternary battery systems, which refers to a complicated process; additionally, for recovering nickel, cobalt and manganese in the prior art, a method of adding fluoride salts is usually adopted to perform impurity-removal treatment on the leaching solution; however, this method has an unsatisfactory impurity-removal effect in actual operation, and the obtained solution still contains a certain amount of calcium and magnesium impurity elements. Therefore, it is necessary to develop a new method of removing impurities and recycling to solve the above problems.

SUMMARY

An object of the present application is to provide a method of preparing a battery-grade Ni—Co—Mn mixed solution and a battery-grade Mn solution, which is used to solve the problem in the prior art that, when the Co, Ni, and Mn elements in the waste lithium-ion battery are recovered, the recovery rate is low and the impurity removal effect is unsatisfactory.

In order to solve the above technical problem, the present application provides a method of preparing a battery-grade Ni—Co—Mn mixed solution and a battery-grade Mn solution, steps of which include acid dissolution, alkalization to remove impurities, synchronous precipitation of calcium, magnesium and lithium, deep ageing to remove impurities, synergistic extraction and refining extraction; the deep ageing to remove impurities step includes: subjecting a filtrate obtained after the synchronous precipitation of calcium, magnesium and lithium step to deep ageing, and filtering the filtrate to remove impurities to obtain an ageing filtrate, wherein an ageing time is more than 4 h, and an ageing temperature is 25° C.

In the method, the acid dissolution step specifically includes: immersing a mixed powder of lithium-ion battery positive and negative electrodes into an acid solution, and adding a reducing agent until a valuable metal is completely dissolved, so as to obtain an acid dissolution mixed solution; in the step, the acid solution is sulfuric acid or hydrochloric acid, and the reducing agent is one or a mixture of at least two of hydrogen peroxide, sulfur dioxide, sodium sulfite and sodium pyrosulfite.

In the step, an addition amount of the acid solution is 1-2 times a theoretical molar amount in the reaction process of the acid solution; an addition amount of the reducing agent is 1-3 times a theoretical molar amount in the reaction process of the reducing agent.

In the step, the mixed powder of lithium-ion battery positive and negative electrodes is a lithium-ion battery system mixture containing nickel, cobalt and manganese elements.

In the method, the alkalization to remove impurities step includes: adding an oxidizing agent and an alkali solution to the acid dissolution mixed solution, and after adjusting a pH value of the solution to 2.5-5.5, filtering the solution to remove iron and aluminum, so as to obtain an alkalization mixed solution; the oxidizing agent is one or a mixture of at least two of air, oxygen, sodium chlorate, hydrogen peroxide and sulfur dioxide/air, and an addition amount of the oxidizing agent is more than 1.05 times a theoretical molar amount in the reaction process of the oxidizing agent; the alkali solution is one or a mixture of at least two of sodium hydroxide, potassium hydroxide and ammonia, and a concentration of the alkali solution is 5-32%.

In the method, the synchronous precipitation of calcium, magnesium and lithium step includes: adding a soluble fluoride salt to the alkalization mixed solution, and after a stirring reaction, filtering the mixture to remove lithium, calcium and magnesium, so as to obtain a synchronous precipitation filtrate; the soluble fluoride salt is one or a mixture of two of sodium fluoride and ammonium fluoride, and an addition amount of the soluble fluoride salt is 1-2 times a molar amount of lithium, calcium and magnesium in the solution; a temperature of the stirring reaction is 60° C., and a reaction time is 2 h.

In the method, the synergistic extraction step includes: subjecting the ageing filtrate to synergistic extraction by using P204 extractant, so as to obtain a loaded organic phase and a raffinate; the loaded organic phase is subjected to acid washing and then multistage back-extraction, so as to obtain a battery-grade Ni—Co—Mn mixed solution and a Mn-containing solution, separately.

In the method, the refining extraction step includes: subjecting the Mn-containing solution to extraction for impurity removal by using P204 extractant, in which a raffinate obtained is a battery-grade Mn solution.

In the method, the method of preparing a battery-grade Ni—Co—Mn mixed solution and a battery-grade Mn solution further includes a wastewater treatment step, and the wastewater treatment step is used for treating the raffinate obtained in the synergistic extraction step.

The beneficial effects of the present application are that: in the case different from the prior art, the present application provides a method of preparing a battery-grade Ni—Co—Mn mixed solution and a battery-grade Mn solution; by combining multiple process steps of synchronous precipitation of calcium, magnesium and lithium, deep ageing to remove impurities and synergistic extraction, the impurity content of the obtained battery-grade Ni—Co—Mn mixed solution is significantly reduced and the recovery rate of nickel, cobalt and manganese is significantly increased; the obtained battery-grade Ni—Co—Mn mixed solution can be directly applied to preparing the ternary precursor material for lithium batteries, and no other purification treatment is required; meanwhile, a battery-grade Mn solution can be obtained simultaneously, which facilitates to the large-scale application of the process and economic benefit improvement.

BRIEF DESCRIPTION OF DRAWINGS

FIG. 1 is a process flow diagram of an example of a method of preparing a battery-grade Ni—Co—Mn mixed solution and a battery-grade Mn solution in the present application.

DETAILED DESCRIPTION

The technical solutions in example of the present application will be clearly and completely described below with reference to the accompanying drawing in the example of the present application. Obviously, the described examples are not all the examples of the present application, but only a part of them. Based on the examples of the present application, all other examples, obtained by those skilled in the art without creative efforts, shall fall within the protection scope of the present application.

Please refer to FIG. 1, and FIG. 1 is a process flow diagram of an example of a method of preparing a battery-grade Ni—Co—Mn mixed solution and a battery-grade Mn solution in the present application. The method of preparing a battery-grade Ni—Co—Mn mixed solution and a battery-grade Mn solution in the present application includes steps: acid dissolution S1, alkalization to remove impurities S2, synchronous precipitation of calcium, magnesium and lithium S3, deep ageing to remove impurities S4, synergistic extraction S5, refining extraction S6 and wastewater treatment S7, and specifically, each step in the preparation method is specifically described respectively.

S1: acid dissolution. This step specifically includes: a mixed powder of lithium-ion battery positive and negative electrodes is immersed into an acid solution and a reducing agent is being added until completely dissolution, so as to obtain an acid dissolution mixed solution; in the step, the acid solution is sulfuric acid or hydrochloric acid, an addition amount of the acid solution is 1-2 times a theoretical molar amount in the reaction process of the acid solution, the reducing agent is one or a mixture of at least two of hydrogen peroxide, sulfur dioxide, sodium sulfite and sodium pyrosulfite, an addition amount of the reducing agent is 1-3 times a theoretical molar amount in the reaction process of the reducing agent; the acid solution and reducing agent actually added both has an excess amount compared with the theoretical value to ensure that the metal elements in the mixed powder of lithium-ion battery positive and negative electrodes can be fully dissolved, such as nickel, cobalt, manganese and lithium. In the method of this example, the mixed powder of lithium-ion battery positive and negative electrodes is a lithium-ion battery system mixture containing nickel, cobalt and manganese elements, such as a system mixture composed of one or more of a Ni—Co—Mn—Li system containing nickel-cobalt-manganese elements, a lithium cobalt oxide system and a Ni—Co—Al system, and all these system mixtures can be used as the mixed powder of lithium-ion battery positive and negative electrodes and applied to the preparation process in the present application.

S2: alkalization to remove impurities. This step specifically includes: an oxidizing agent and an alkali solution is added to the acid dissolution mixed solution, and after adjusting a pH value of the solution to 2.5-5.5, the solution is filtered to remove iron and aluminum so as to obtain an alkalization mixed solution; the oxidizing agent is one or a mixture of at least two of air, oxygen, sodium chlorate, hydrogen peroxide and sulfur dioxide/air, and an addition amount of the oxidizing agent is more than 1.05 times a theoretical molar amount in the reaction process of the oxidizing agent; the alkali solution is one or a mixture of at least two of sodium hydroxide, potassium hydroxide and ammonia, and a concentration of the alkali solution is 5-32%; an object of this step is to adjust the acid dissolution mixed solution to a suitable alkaline range, mainly aiming at removing the iron and aluminum elements in the solution in a form of hydroxide.

S3: synchronous precipitation of calcium, magnesium and lithium. This step specifically includes: a soluble fluoride salt is added to the alkalization mixed solution, and after a stirring reaction, the mixture is filtered to remove lithium, calcium and magnesium elements, so as to obtain a synchronous precipitation filtrate; the soluble fluoride salt is one or a mixture of two of sodium fluoride and ammonium fluoride, and an addition amount of the soluble fluoride salt is 1-2 times a molar amount of lithium, calcium and magnesium in the solution; a temperature of the stirring reaction is 60° C., and a reaction time is 2 h; an object of this step is to subject the $Ca^{2+}$, $Mg^{2+}$ and $Li^+$ ions in the alkalization mixed solution to react with $F^+$, simultaneously generating the $CaF_2$, $MgF_2$ and $LiF$ precipitation, and thus simultaneously separating $Ca^{2+}$, $Mg^{2+}$, $Li^+$ from the alkalization mixed solution.

S4: deep ageing to remove impurities. This step specifically includes: a filtrate obtained after the synchronous precipitation of calcium, magnesium and lithium step is subjected to deep ageing, and filtered to remove impurities to obtain an ageing filtrate, wherein an ageing time is more than 4 h, and an ageing temperature is 25° C.; an object of this step is that, although the addition amount of soluble fluoride salt is strictly controlled in S3, which separates most of $Ca^{2+}$, $Mg^{2+}$ and $Li^+$ out from the filtrate obtained after the S3 while ensuring that $Ni^{2+}$, $Co^{2+}$ and $Mn^{2+}$ will not precipitate and lost, there are still some $Ca^{2+}$, $Mg^{2+}$ and $Li^+$ remaining in the filtrate; under this circumstance, performing ageing facilitates the generated fluoride precipitate particles growing larger, and fully precipitates the residual $Ca^{2+}$, $Mg^{2+}$ and $Li^+$, so that the content of $Ca^{2+}$, $Mg^{2+}$ and $Li^+$ in the ageing filtrate obtained after filtration is greatly reduced.

S5: synergistic extraction. This step specifically includes: the ageing filtrate is subjected to synergistic extraction by using P204 extractant, so as to obtain a loaded organic phase and a raffinate; the loaded organic phase is subjected to acid washing and then multistage back-extraction, so as to obtain a battery-grade Ni—Co—Mn mixed solution and a Mn-containing solution, separately. An object of this step is that, by using P204 extractant for back-extraction, it is aimed at that $Ca^{2+}$, $Mg^{2+}$ and $Li^+$ are further removed from the ageing filtrate, thereby improving the quality of the obtained Mn-containing solution and the battery-grade Ni—Co—Mn mixed solution. Due to the impurity elements contained with a certain amount during back-extraction, it is necessary to carry out the subsequent refining extraction S6 step.

S6: refining extraction. This step specifically includes: the Mn-containing solution is subjected to extraction for impurity removal by using P204 extractant, further reducing calcium and magnesium impurities in the solution, in which a raffinate obtained is a battery-grade Mn solution.

S7: wastewater treatment. This step is mainly used to treat the raffinate obtained in the synergistic extraction step, and the specific form of treating wastewater can be arranged according to actual requirements, which is left without limitation herein.

In the aspect of the comparison between the present scheme and the prior art scheme, the prior art adopts multiple extractions, in which the battery-grade nickel sulfate solution, manganese sulfate solution and cobalt sulfate solution are obtained separately; the present application is characterized by synergistic extraction, in which nickel, cobalt and manganese are simultaneously extracted out, and then subjected to multistage back-extraction, giving a high-purity battery-grade nickel-cobalt-manganese solution and a calcium-containing manganese sulfate solution, and the calcium-containing manganese sulfate solution is then subjected to refining extraction and gives a battery-grade manganese sulfate solution; the obtained battery-grade Ni—Co—Mn mixed solution has extremely low impurity content, and can be directly applied to preparing the ternary precursor material for lithium batteries, no other purification processing step is required, the recovery efficiency is significantly improved, and the technological process is simple.

The method of preparing a battery-grade Ni—Co—Mn mixed solution in the present application will be further described below in detail with reference to specific examples.

Example 1

100 g of a mixed powder of lithium-ion battery positive and negative electrodes was weighted out, added with 100 ml of sulfuric acid and 60 g of 30% hydrogen peroxide for acid leaching, filtered to remove insoluble residues to obtain a leaching solution, and the leaching rates of cobalt, nickel and manganese were: 91.64%, 91.65% and 90.67%, respectively. The leaching solution was adjusted to pH 5.0 with 10% sodium hydroxide solution while the air was being introduced, reacted for 2 h and then filtered to remove iron and aluminum, so as to obtain an alkalization mixed solution. The alkalization mixed solution was added with sodium fluoride with an amount 1.5 times the theoretical amount, stirred and reacted at 60° C. for 2 h and then filtered to remove lithium, calcium and magnesium, so as to obtain a synchronous precipitation filtrate; the obtained synchronous precipitation filtrate was aged at room temperature for 4 h to deeply remove calcium, magnesium and lithium, and filtered to give an ageing filtrate containing 55 g/L of cobalt, nickel and manganese, in which Fe: 0.0001 g/L, Al: 0.0001 g/L, Ca: 0.0007 g/L, Mg: 0.0001 g/L, Li: 0.645 g/L, and the impurity content was extremely low.

Example 2

100 g of a mixed powder of lithium-ion battery positive and negative electrodes was weighted out, added with 123 ml of sulfuric acid and 135 g of 30% hydrogen peroxide for acid leaching, filtered to remove insoluble residues to obtain a leaching solution, and the leaching rates of cobalt, nickel and manganese were: 99.64%, 99.65% and 98.67%, respectively. After removing insoluble residues by filtration, the leaching solution was added with hydrogen peroxide with an amount 1.05 times the theoretical molar amount, and adjusted to pH 4.5 by adding 10% sodium hydroxide solution, reacted for 2 h and then filtered to remove iron and aluminum, so as to obtain an alkalization mixed solution. The alkalization mixed solution was added with sodium fluoride with an amount 1.2 times the theoretical amount, stirred and reacted at 60° C. for 2 h and then filtered to remove lithium, calcium and magnesium, so as to obtain a synchronous precipitation filtrate; the obtained synchronous precipitation filtrate was aged for at room temperature 4 h to deeply remove calcium, magnesium and lithium, and filtered to give an ageing filtrate containing 60 g/L of cobalt, nickel and manganese, in which Fe: 0.0002 g/L, Al: 0.0001 g/L, Ca: 0.0029 g/L, Mg: 0.0001 g/L, Li: 0.722 g/L, and the impurity content was extremely low.

Example 3

The ageing filtrate prepared in Example 1 was used. The ageing filtrate was subjected to 7-stage countercurrent extraction with the P204 organic solvent with a saponification rate of 45% at a phase ratio of 1:3, the three of nickel, cobalt and manganese were extracted from the solution, and the obtained organic phase loaded with nickel, cobalt and manganese was subjected to 8-stage countercurrent washing with 0.8 mol/L dilute acid at a phase ratio of 3:1. After washing, the organic phase was subjected to 8-stage countercurrent back-extraction with 4 mol/L sulfuric acid at a phase ratio of 8:1, and the back-extraction solution was a battery-grade nickel-cobalt-manganese solution, in which a total content of nickel-cobalt-manganese was more than 100 g/L. A manganese-containing solution outlet was arranged in the middle of the back-extraction section, and the manganese-containing solution was refined to remove impurities by P204 extractant, so as to obtain a battery-grade manganese sulfate solution.

Example 4

The ageing filtrate prepared in Example 2 was used. The ageing filtrate was subjected to 12-stage countercurrent extraction with the P204 organic solvent with a saponification rate of 55% at a phase ratio of 1:4, the three of nickel, cobalt and manganese were extracted from the solution, and the obtained organic phase loaded with nickel, cobalt and manganese was subjected to 12-stage countercurrent washing with 1 mol/L dilute acid at a phase ratio of 4:1. After washing, the organic phase was subjected to 12-stage countercurrent back-extraction with 4.5 mol/L sulfuric acid at a phase ratio of 9:1, and the back-extraction solution was a battery-grade nickel-cobalt-manganese solution, in which a total content of nickel-cobalt-manganese was more than 130 g/L. A manganese-containing solution outlet was arranged in the middle of the back-extraction section, and the manganese-containing solution was refined to remove impurities by P204 extractant, so as to obtain a battery-grade manganese sulfate solution.

The present application provides a method of preparing a battery-grade Ni—Co—Mn mixed solution and a battery-grade Mn solution, which is different from the prior art. By combining multiple process steps of synchronous precipitation of calcium, magnesium and lithium, deep ageing to remove impurities and synergistic extraction, the impurity content of the obtained battery-grade Ni—Co—Mn mixed solution is significantly reduced and the recovery rate of nickel, cobalt and manganese is significantly increased; the obtained battery-grade Ni—Co—Mn mixed solution can be directly applied to preparing the ternary precursor material for lithium batteries, and no other purification treatment is required; meanwhile, a battery-grade Mn solution can be obtained simultaneously, which facilitates to the large-scale application of the process and economic benefit improvement.

It should be noted that the various examples described above all belong to the same inventive concept, the description of each example has its own emphasis, and for details not described in individual examples, reference may be made to descriptions in other examples.

The above-mentioned examples merely describe the implementations of the present invention, and although the description thereof is relatively specific and detailed, it should not be construed as a limitation to the scope of the invention patent. It should be pointed out that, for those skilled in the art, some variations and modifications may be made without departing from the inventive concept, and those variations and modification should all be regarded as falling within the protection scope of the present invention. Therefore, the protection scope of the present invention should be defined by the appended claims.

What is claimed is:

1. A method of preparing a battery-grade Ni—Co—Mn mixed solution and a battery-grade Mn solution, comprising an acid dissolution step, an alkalization step to remove impurities, a synchronous precipitation of calcium, magnesium and lithium step, a deep ageing step to remove impurities, a synergistic extraction step, and a refining extraction step;

the alkalization step to remove impurities comprises: adding an oxidizing agent and an alkali solution to a solution gained after the acid dissolution step, and after adjusting a pH value of a solution gained after alkalization and oxidation to 2.5-5.5, filtering a solution gained after pH adjusting to remove iron and aluminum, so as to obtain an alkalization mixed solution;

the synchronous precipitation of calcium, magnesium and lithium step comprises: adding a soluble fluoride salt to the alkalization mixed solution, and after a stirring reaction, filtering the mixture to remove lithium, calcium and magnesium, so as to obtain a synchronous precipitation filtrate; the soluble fluoride salt is one or a mixture of two of sodium fluoride and ammonium fluoride, and an addition amount of the soluble fluoride salt is 1-2 times a molar amount of lithium, calcium and magnesium in the solution; a temperature of the stirring reaction is 60° C., and a reaction time is 2 hours;

the deep ageing step to remove impurities comprises: subjecting a filtrate obtained after the synchronous precipitation of calcium, magnesium and lithium step to deep ageing, and filtering the filtrate to remove impurities to obtain a deep ageing filtrate, wherein a deep ageing time is more than 4 hours, and a deep ageing temperature is 25° C.;

the synergistic extraction step comprises: subjecting the deep ageing filtrate to synergistic extraction by using P204 extractant, so as to obtain a loaded organic phase and a raffinate; the loaded organic phase is subjected to acid washing and then multistage back-extraction, so as to obtain a battery-grade Ni—Co—Mn mixed solution and a manganese-containing solution, separately;

the refining extraction step comprises: subjecting the Mn-containing solution to extraction for impurity removal by using P204 extractant, wherein a raffinate obtained is a battery-grade Mn solution.

2. The method of preparing a battery-grade Ni—Co—Mn mixed solution and a battery-grade Mn solution according to claim 1, wherein the acid dissolution step specifically comprises:

immersing a mixed powder of lithium-ion battery positive and negative electrodes into an acid solution, and adding a reducing agent until a valuable metal is completely dissolved, so as to obtain an acid dissolution mixed solution;

wherein the acid solution is sulfuric acid or hydrochloric acid, and the reducing agent is one or a mixture of at least two of hydrogen peroxide, sulfur dioxide, sodium sulfite and sodium pyrosulfite.

3. The method of preparing a battery-grade Ni—Co—Mn mixed solution and a battery-grade Mn solution according to claim 2, wherein an addition amount of the acid solution is 1-2 times a theoretical molar amount in a reaction process of the acid dissolution step; an addition amount of the reducing agent is 1-3 times a theoretical molar amount in a reaction process of the alkalization step to remove impurities.

4. The method of preparing a battery-grade Ni—Co—Mn mixed solution and a battery-grade Mn solution according to claim 2, wherein the mixed powder of lithium-ion battery positive and negative electrodes is a lithium-ion battery system mixture containing nickel, cobalt and manganese elements.

5. The method of preparing a battery-grade Ni—Co—Mn mixed solution and a battery-grade Mn solution according to claim 2, wherein the oxidizing agent is one or a mixture of at least two of air, oxygen, sodium chlorate, hydrogen peroxide and sulfur dioxide/air, and an addition amount of the oxidizing agent is more than 1.05 times a theoretical molar amount in a reaction process of the alkalization step to remove impurities;

the alkali solution is one or a mixture of at least two of sodium hydroxide, potassium hydroxide and ammonia, and a concentration of the alkali solution is 5-32 wt %.

6. The method of preparing a battery-grade Ni—Co—Mn mixed solution and a battery-grade Mn solution according to claim 1, wherein the method of preparing a battery-grade Ni—Co—Mn mixed solution and a battery-grade Mn solution further comprises a wastewater treatment step, and the wastewater treatment step is used for treating the raffinate obtained in the synergistic extraction step.

* * * * *